Patented July 21, 1953

2,646,452

UNITED STATES PATENT OFFICE 2,646,452

ALKYLATION BY MODIFIED ALUMINUM HALIDE CATALYST

Louis Schmerling, Riverside, Ill., assignor to Universal Oil Products Company, Chicago, Ill., a corporation of Delaware No Drawing. Application May 20, 1949, Serial No. 94,523

2 Claims. (Cl. 260—683.4)

This invention relates to aluminum halide complex compounds useful in catalyzing a particular class of reactions involving organic compounds, and particularly in hydrocarbon conversion reactions, in which a catalyst having a somewhat milder catalyzing activity than the unmodified aluminum halide is advantageous in effecting the conversion reaction desired. More specifically, the invention concerns a modified aluminum halide catalyst consisting of a complex of an aluminum halide and a phosphorus oxyhalide compound for catalyzing various types of condensation reactions.

The aluminum halides of the middle halogens, that is, aluminum chloride and aluminum bromide, are known for their catalytic activity in promoting a wide variety of organic reactions. The aluminum halides, however, because of their pronounced activity in promoting condensation reactions between the selected reactants, often form sludge-like complexes during the reaction, especially in reactions involving organic compounds which contain a highly reactive group or one which is readily cleaved from the major portion of the reacting compound in the presence of aluminum halide and at the reaction conditions utilized. In many instances in which the unmodified aluminum halide catalyst is utilized, extensive side reactions may occur or the reactants may polymerize or condense into high molecular weight resinous or tarry materials. Because of these undesirable characteristics of unmodified aluminum halide catalysts, the processes in which they are generally employed are characterized by relatively high catalyst losses and lower yields than would be the case were sludge formation and other side reactions eliminated from the process.

One object of the present process is to modify the catalytic activity of aluminum chloride and aluminum bromide to thereby overcome substantially the aforementioned disadvantages.

Another object of this invention is to provide a modified aluminum halide catalyst which may be separated from the products of the reaction and utilized in a subsequent reaction without further treatment or regeneration of the catalyst.

In accordance with one of its embodiments, the invention comprises an improvement in the catalysis of organic chemical reactions of the type which normally can be catalyzed by an aluminum halide catalyst, said improvement residing in the use of a modified aluminum halide catalyst prepared by the reaction of aluminum chloride and/or aluminum bromide with a phosphorus oxyhalide compound.

A more specific embodiment of the invention concerns a hydrocarbon conversion process catalyzed by an aluminum halide complex catalyst formed by reacting at least one mole of an aluminum halide of a middle halogen with phosphorus oxychloride at conditions resulting in the formation of a complex between said aluminum halide and said phosphorus oxychloride.

The modified aluminum halide catalyst of this invention is believed to be a molecular addition complex of the aluminum halide reactant and the phosphorus oxyhalide component involving approximately equimolar proportions of the reactants. Aluminum chloride is necessarily the least expensive of the anhydrous aluminum halides utilizable herein, although aluminum bromide, as well as mixtures thereof with aluminum chloride form catalytic composites with the phosphorus oxyhalide component which are utilizable in the conversion processes herein provided.

Among the phosphorus oxyhalides which may be employed for the preparation of the present complex catalyst are included phosphorus oxychloride and phosphorus oxybromide, which comprise the preferred members of this group, phosphorus oxybromodichloride, phosphorus oxychlorodibromide, phosphorus trioxytetrachloride. The latter compounds react with the aluminum chloride or aluminum bromide accompanied by the evolution of heat to form a crystalline or granular mass of the catalyst upon cooling. There is no apparent essential requirement for the use of phosphorus oxybromide only with aluminum bromide or phosphorus oxychloride only with aluminum chloride, although it is generally preferred to maintain the halogen radicals uniform in the two classes of reactants, particularly if the components or derivatives thereof are to be recovered from the catalyst composite in a subsequent operation.

The catalyst complexes herein provided for utilization in organic reactions are formed by combining an individual aluminum halide or a mixture of the aluminum halides and phosphorus oxyhalide reactants at temperatures of from about −30° to about 150° C. The preferred temperatures lie in the range from about −10° to about 50°. The respective reactants, for example, may be mixed at substantially room temperature and following the ensuing exothermic reaction in which complex formation reaction takes place, the reaction mass may be allowed to cool to form a granular, crystalline mass of the desired addition complex catalyst. The solidified product may be thereafter broken into a powder and utilized as such or as particles formed from the powder by pelleting or extrusion methods.

The reaction between the phosphorus oxyhalide and aluminum halide reactants may be controlled by mixing the reactants in the presence of a suitable solvent, such as an inert normal paraffin hydrocarbon or a nitroparaffin solvent.

The various catalyst complexes which may be formed from the variety of utilizable reactants hereinabove specified, while they all have catalytic activity in various hydrocarbon conversion reactions, are not necessarily equivalent in their catalytic effectiveness. The most active catalysts are formed by interacting at least one, up to about two, molecular proportions of the aluminum halide reactant with one molecular proportion of the phosphorus oxyhalide reactant. The preferred catalysts herein provided contain equimolecular proportions of the two reactants.

Since the essence of the present invention resides in the modification of aluminum chloride and aluminum bromide catalysts to thereby eliminate certain disadvantageous properties inherent in such catalysts and/or to modify their violent activity, the complexes retain sufficient of the catalytic properties of the original aluminum halide that it may be utilized in general to catalyze any of the organic chemical reactions which can be catalyzed by unmodified aluminum chloride or aluminum bromide. In other words, the modified catalysts of this invention may be employed to the same extent and for the same purposes, generally speaking, as aluminum chloride and aluminum bromide catalysts. In particular, the catalysts of the present invention are highly advantageous in effecting various hydrocarbon conversion reactions, such as the isomerization of paraffinic or naphthenic hydrocarbons, the alkylation of aromatic, naphthenic, or paraffinic hydrocarbons with olefins or other alkylating agents, the polymerization of olefins, the treatment of hydrocarbon mixtures such as gasoline fractions to improve their antiknock rating, etc. Of the various hydrocarbon conversion reactions, the present catalysts find their most important application in the conversion of paraffin hydrocarbons to other branched chain paraffins, for example, either by isomerization or alkylation.

A hydrogen halide promoter, particularly hydrogen chloride, or hydrogen bromide, may be employed with beneficial results with the modified aluminum chloride and aluminum bromide catalysts herein provided. Generally speaking, the hydrogen halide promoter may be used in concentrations of from about 0.5 to about 5 mole per cent of the hydrocarbon charged to the process. In certain cases, the use of hydrogen may also be beneficial during the particular reaction.

Depending upon the physical form of the catalyst, it may be utilized in any of the various available types of operation, such as batch or continuous methods of production. For example, the extruded or pelleted form of the catalyst may be utilized in stationary bed type operations, in which the catalyst particles are contained in a reaction chamber and the reactants, in liquid or vapor phase, pass over or through the catalyst at suitable temperatures, pressures and rates of flow.

In another type of operation, the catalyst is a finely divided powder and may be suspended in a stationary mass of a liquid reactant undergoing conversion or maintained in a so-called "fluidized" condition in which the stream of reactants as a vapor or as a liquid is passed through a mass of the finely divided catalyst at a relatively high velocity and at the desired reaction conditions to maintain the catalyst particles dispersed in turbulence throughout the stream of reactants. The present composite may also be deposited upon or admixed with various inert carriers such as alumina, silica, activated carbon, various silicate clays, as an intimate admixture therewith or deposited on the surface of particles of such inert carriers.

The following examples are introduced for illustrative purposes to indicate the method of manufacturing the present catalyst composite and to illustrate the character of the results obtainable from a typical reaction process in which the catalyst is utilized to effect the particular condensation reaction. In thus specifying a typical catalyst for utilization therein, it is not intended to thereby restrict the scope of the present invention in accordance with the particular data presented in said examples.

*Example I*

A catalyst complex of the type herein provided was prepared by mixing equimolecular proportions of anhydrous aluminum chloride and phosphorus oxychloride. The phosphorus oxychloride as a liquid was slowly poured into a reaction vessel containing anhydrous aluminum chloride at room temperature and the mixture rapidly stirred to effect intimate and uniform admixture of the reactants. The reaction mixture heated spontaneously as the result of the exothermic reaction involved to form a granular mass of crystals, the maximum temperature reached was 103° C. There was no hydrogen halide liberated from the reaction mixture, indicating the formation of an addition complex of the reactants, and when heated under reduced pressure, the complex failed to liberate aluminum chloride or phosphorus oxychloride therefrom.

The activity of the catalyst for the condensation of an alkyl halide and an aromatic hydrocarbon is shown in the following run.

10 grams of the modified aluminum chloride catalyst prepared as described above was added to a mixture of one mole of benzene and 0.5 mole of tertiary butyl chloride at room temperature. The reaction mixture was shaken for one hour during which hydrogen chloride was evolved. The reaction was characterized by the presence of only a single liquid phase; that is, there was no formation of a lower sludge layer as noted in a similar reaction utilizing an unmodified aluminum chloride catalyst. The catalyst composite remained solid and was recoverable from the reaction mixture in substantially its original granular condition. The yield of products represented a substantially quantitative conversion of the tertiary butyl chloride to monotertiarybutylbenzene and particularly to crystalline para-di-tertiarybutylbenzene. A similar uniphase reaction mixture is obtained utilizing the above catalyst in the alkylation of benzene with isobutylene at a temperature of about 20° C.

*Example II*

A catalyst was prepared by mixing equimolecular proportions of anhydrous aluminum chloride and phosphorus oxychloride at 0° C. at which temperature the phosphorus oxychloride was solid. An exothermic reaction occurred and a solid catalyst complex was obtained as in Example I.

Tests made by contacting about 1 g. of this catalyst with from 5 to 15 g. of a hydrocarbon or hydrocarbon mixture showed that the catalyst was effective for the polymerization of isobutylene and of 2-methylpentadiene and for the alkylation of benzene with isobutylene.

*Example III*

If a more active catalyst than the preparations described in Examples I and II is desired, a molecular excess of aluminum chloride over phosphorus oxychloride is employed. Thus, mixing 1.5 molecular proportions of aluminum chloride with 1.0 molecular proportion of phosphorus oxychloride under the conditions of Example II yields a crystalline catalyst which is especially useful in the alkylation of isoparaffins. For example, about 10 g. of such a catalyst is mixed with about 100 g. of isobutane and 1 g. of tertiary butyl chloride in a glass liner (cooled to —78° C.) and sealed into a rotating autoclave. Ethylene is passed into a pressure of about 40 atmospheres and the autoclave rotated at about 45° C. during about four hours. The product consists of a mixture of paraffinic hydrocarbons, particularly 2,3-dimethylbutane.

I claim as my invention:

1. A conversion process which comprises alkylating a hydrocarbon in the presence of catalyst comprising the product resulting from the reaction of one mole of a phosphorus oxyhalide with from one to two moles of an anhydrous aluminum halide selected from the group consisting of aluminum chloride and aluminum bromide at a temperature of from about —30° to about 150° C.

2. A conversion process which comprises alkylating a hydrocarbon in the presence of catalyst comprising the product resulting from the reaction of equimolecular proportions of a phosphorus oxyhalide and an anhydrous aluminum halide selected from the group consisting of aluminum chloride and aluminum bromide at a temperature of from about —30° to about 150° C.

LOUIS SCHMERLING.

References Cited in the file of this patent

UNITED STATES PATENTS

| Number | Name | Date |
|---|---|---|
| 2,175,092 | Ralston | Oct. 3, 1939 |
| 2,395,199 | Schulze et al. | Feb. 19, 1946 |
| 2,402,051 | Ipatieff et al. | June 11, 1946 |
| 2,480,254 | Mavity | Aug. 30, 1949 |
| 2,481,273 | Young | Sept. 6, 1949 |
| 2,482,145 | Antheaume | Sept. 20, 1949 |

OTHER REFERENCES

Dye, Journ. American Chemical Soc., vol. 70, (1948) pp. 2595–6.

Casselmann, Annalen der Chemie, vol. 98, (1856) pp. 220–23.